United States Patent [19]

Suzuki

[11] Patent Number: 4,995,139
[45] Date of Patent: Feb. 26, 1991

[54] TORQUE CONTROL SYSTEM FOR ENGINE PERFORMANCE TEST MACHINE FOR INTERNAL COMBUSTION ENGINES

[75] Inventor: Yorikatsu Suzuki, Kanagawa, Japan
[73] Assignee: Kabushiki Kaisha Meidensha, Tokyo, Japan
[21] Appl. No.: 402,790
[22] Filed: Sep. 5, 1989
[30] Foreign Application Priority Data
   Sep. 5, 1988 [JP] Japan .................... 63-221582
[51] Int. Cl.$^5$ ............................. G01L 5/13
[52] U.S. Cl. .................................... 73/116
[58] Field of Search ............ 73/116, 117, 117.1, 73/117.2, 862.36

[56] References Cited

U.S. PATENT DOCUMENTS

| | | | |
|---|---|---|---|
| 3,898,875 | 8/1975 | Knoop et al. | 73/116 |
| 3,926,043 | 12/1975 | Marshall et al. | 73/117 |
| 4,186,593 | 2/1980 | Watanabe | 73/117 |
| 4,758,967 | 7/1988 | Shmuter et al. | 73/117 |

Primary Examiner—R. Raevis
Attorney, Agent, or Firm—Bachman & LaPointe

[57] ABSTRACT

A torque control system for an engine performance test machine for internal combustion engines comprises an oscillating type electric dynamometer including a rotor and an oscillating member being oscillatably supported around said rotor and a connecting device for interconnecting the rotor shaft and the rotating member of the engine. The torque control system also includes a load cell for monitoring oscillating torque of the oscillating member, means for generating a first torque occurring at the rotor, means for generating a second torque occurring at the rotating member. The torque control system also includes means for generating a detection signal representative of the sum of said oscillating torque, and the first and second torques, and a controller for adjusting the torque generated by the engine in response to the detection signal.

15 Claims, 4 Drawing Sheets

TORQUE CONTROL SYSTEM FOR ENGINE PERFORMANCE TEST MACHINE FOR INTERNAL COMBUSTION ENGINES

BACKGROUND OF THE INVENTION

1. Field of the Invention

The present invention relates to a torque control system which is optimally adapted for use in an engine performance test machine including an oscillating type electric dynamometer so as to make an engine performance test for internal combustion engines under a predetermined operating mode wherein the engine revolution and the output torque of the engine are changed in accordance with a predetermined test pattern.

2. Description of the Prior Art

Figure 3:
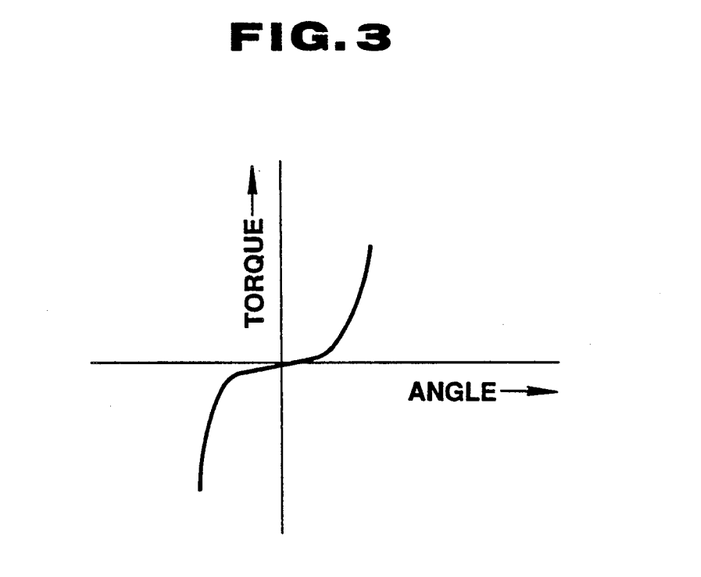
FIG. 3 is a graph illustrating torsional characteristics of a clutch plate acting as a buffering device for the engine performance test machine.

In an engine performance test machine for internal combustion engines, an oscillating type electric dynamometer is traditionally used. The rotor shaft of the electric dynamometer is connected through a coupling device to the rotating member of the engine, which includes a crankshaft and a flywheel. A buffering device, such as a shaft having a rubber damper is usually provided between the rotating member and the coupling device so as to prevent damage in the coupling device due to torque fluctuations generated by the engine. For the same reason, a clutch plate having torsional characteristics as shown in FIG. 3 is often provided between the rotating member of the engine and the coupling device. As is generally known, the torque fluctuation of diesel engines is greater than gasoline engines. For this reason, in engine performance tests for diesel engines, both the buffering device and the clutch plate are generally used. When engine performance, such as output torque, is measured under a particularly steady operating state of the engine by the oscillating type electric dynamometer, the mean engine torque is preponderantly detected and measured by the dynamometer. In the above mentioned test, the component of engine torque fluctuation is not important and is not detected. The component of engine torque fluctuation is actually absorbed as an oscillating energy relative to the oscillating member which has a relatively large axial moment of inertia and which is disposed around the rotor of the dynamometer such that the oscillating member is oscillatably supported through bearings in a conventional method.

Recently, there have been proposed and developed various engine performance test machines for internal combustion engines in which the engine performance tests are made of transient operating states as well as steady operating states, that is the test is made in a predetermined complicated test mode combining various transient and steady operating states of the engine. Therefore, a torquemeter which is disposed between the rotating member of the engine and the rotor shaft of the dynamometer, is widely used in such a manner as to continuously detect engine torque measured at a drive shaft of the engine. Specifically, in emission tests for heavy-duty vehicles based on the regulations regarding exhaust gas in the U.S., pollutants in the exhaust gas are measured under a condition wherein engine revolution and output torque are controlled in accordance with a predetermined operating mode of the engine. In such a case, it is desirable that the engine torque is continuously detectable by the torquemeter and the engine revolutions are continuously detected by the pickup serving as a pulse generator for pulse signals representative of an engine revolution. Thus, the engine revolutions and the engine torque may be precisely measured and/or controlled.

Figure 1:
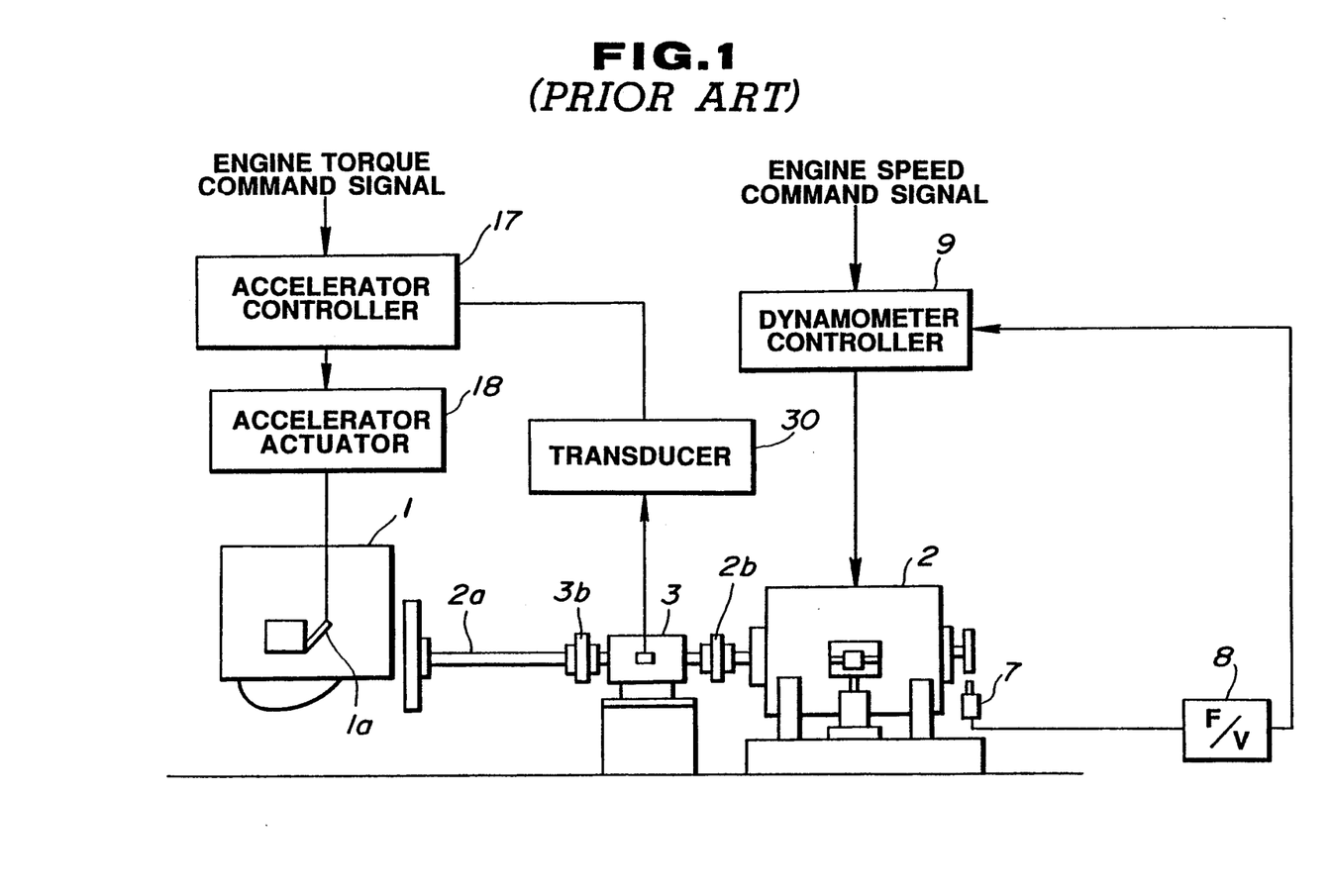
FIG. 1 is a block diagram illustrating a conventional engine performance test machine including an oscillating type electric dynamometer.

One such conventional engine performance test machine is shown in FIG. 1. Referring now to FIG. 1, a rotating member of an internal combustion engine 1 is connected through a connecting shaft, such as a drive shaft 2a land a coupling 3b to an input shaft of a torquemeter 3. The output shaft of the torquemeter 3 is connected through a coupling 2b to the rotor shaft of an oscillating type electric dynamometer 2. The torquemeter 3 outputs a signal representative of shaft torsion being essentially proportional to the output torque generated by the engine 1. The torsion signal from the torquemeter 3 is processed into the engine torque signal by a transducer 30. Thereafter, the engine torque signal is output from the transducer 30 to an accelerator controller 17, and is compared with a preset engine torque command signal representative of a preset engine torque. After comparing the preset torque command signal and the detected engine torque signal, the accelerator controller 17 outputs a signal representative of the difference between the two torque signals to the accelerator actuator 18. The accelerator actuator 18 adjusts the angular position of an accelerator 1a. Thus, the output torque of the engine 1 may be set to a predetermined value.

On the other hand, the engine revolution is detected by a pickup 7 which is disposed in the vicinity of one end of the rotor shaft of the dynamometer 2. The pickup 7 outputs a pulse signal representative of the revolution of the rotor shaft to a frequency/voltage transducer 8, whereby the pulse signal from the pickup 7 is processed into an analog signal representative of an engine revolution. Thereafter, the engine revolution signal is output from the frequency/voltage transducer 8 to a dynamometer controller 9, and is compared with a preset engine revolution command signal representative of a preset engine revolution. After comparing the preset revolution command signal and the detected engine revolution signal, the dynamometer controller 9 outputs a signal representative of the difference between the two revolution signals to the dynamometer 2. Thus, the load relative to the rotor of the dynamometer 2 is adjusted and as a result the revolution of the rotor is adjusted. That is, the engine revolution is set to a predetermined engine revolution. The above mentioned preset engine torque and engine revolution command signals are output via a preset value setting circuit (not shown) to the two controllers 17 and 9, respectively.

Figure 2:
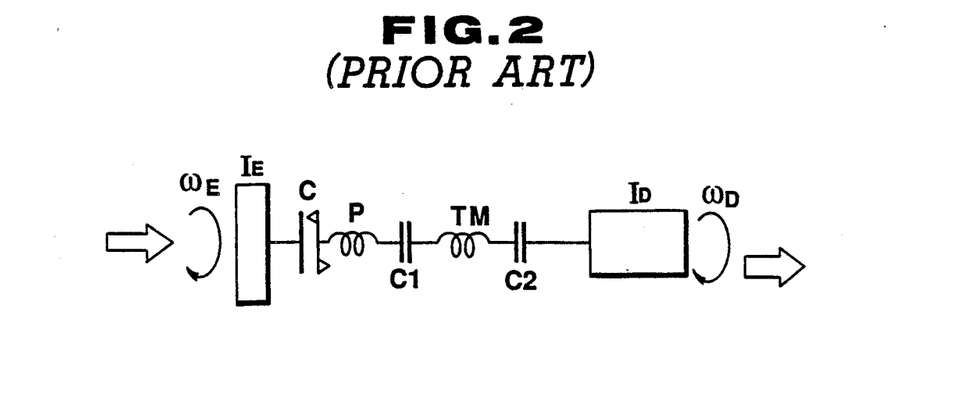
FIG. 2 is a model illustrating the arrangement of the conventional engine performance test machine discussed in the opening paragraphs of the instant disclosure.

However, in the above described conventional engine performance test machine shown in FIG. 1, a torsional vibration system shown in FIG. 2 is constructed. Referring now to FIG. 2, a rotating engine member having ah axial moment of inertia $I_E$ is connected through a clutch plate C, a drive shaft P including a rubber damper, a coupling Cl, a torquemeter TM, and a coupling C2 to a rotor of the dy-amometer having an axial moment of inertia $I_D$, in that order. Therefore, in the conventional engine performance test machine constructed with the above mentioned torsional vibration system, torque fluctuations occur due to the torsional vibration system itself as well as torque fluctuation generated by the engine.

In a four-cycle diesel engine four strokes are utilized, namely an intake stroke, a compression stroke, an explosion stroke, and an exhaust stroke, fluctuation in torque generated by the engine occurs due to the compression stroke wherein the output torque is decreased and the explosion stroke wherein the output torque is increased. For example, in a conventional four cylinder four cycle diesel engine, the frequency of the torque fluctuation is 20 Hz or more, when the engine is running at an idling speed, for example 600 r.p.m. In a conventional six cylinder four cycle diesel engine, the frequency of the torque fluctuation is 22.5 Hz or more, when the engine is running at idling speed, for example 450 r.p.m. Preferably, the response frequency applicable for the engine torque control is 2 Hz or less. Therefore, such a relatively high frequency torque fluctuation generated by the engine may be filtered by means of a low-pass filter. Thus, engine torque control can be executed by engine torque detected through the torquemeter, not including the component of torque fluctuation occurring in the engine.

While, torque fluctuation due to the torsional vibration system occurs depending upon the torsional rigidity of the connecting device including connecting elements, such as a clutch plate, couplings, a drive shaft. The frequency of the torque fluctuation corresponds to the torsional vibration frequency of the torsional vibration system shown in FIG. 2. If the torsional rigidity of the connecting device is set to a relatively high value, there is a possibility that the torsional vibration frequency of the torsional vibration system will become equal to the frequency of the torque fluctuation occurring in the engine. When the two frequencies become equal to each other, resonance relative to the connecting device occurs through torque fluctuation of the engine, thereby resulting in damage to the connecting device. For this reason, the torsional rigidity of the connecting device is generally set to a relatively low value. Traditionally, the connecting device is comprised of the clutch plate of a manual transmission including a plurality of torsion springs and/or a drive shaft including a rubber damper. In this manner, the frequency of the torsional vibration system is set to a relatively low frequency, for example 5 Hz or less. Actually, the frequency of the torsional vibration system changes depending on the torsional characteristics of the clutch plate shown in FIG. 3. As clearly seen in FIG. 3, as the absolute value of the engine torque is increased, the torsional angle of the clutch plate is increased, that is the torsional rigidity of the clutch plate is increased. Conversely, as the absolute value of the engine torque is decreased, the torsional rigidity of the clutch plate is decreased.

As set forth above, the torsional vibration frequency of the torsional vibration system changes within a range of relatively low frequencies, for example 5 Hz or less. Since the torsional vibration frequency range of the torsional vibration system is in close proximity to the response frequency, for example 2 Hz, required for the torque control, the component of torque fluctuation generated due to the torsional vibration system cannot be filtered by the low-pass filter. As a result, the above mentioned component of the torque fluctuation generated by the torsional vibration system deteriorates the torque control accuracy. That is, since the detected engine torque signal input into the accelerator controller 17 also includes the component of the torque fluctuation due to the torsional vibration system, the accelerator 18 can be controlled by the controller 17 in response to the torque fluctuation due to the torsional vibration system as well as the actual output torque fluctuation.

To avoid the deterioration in the torque control, the response frequency may be lowered to 0.5 Hz or less. However, such an extremely low response frequency results in a low responsiveness of the accelerator controller for torque control.

To obtain high accuracy and high responsiveness of torque control, there has been proposed an engine performance test machine in which the engine torque is controlled by a learning control method. One such engine performance test machine has been disclosed in the MEIDEN REVIEW No. 178 (Pages 30-33) issued by Kabushiki Kaisha Meidensha. However, an expensive computer must be used for the learning control.

SUMMARY OF THE INVENTION

It is, therefore in view of the above, disadvantages, an object of the present invention to provide an optimal torque control system having high responsiveness and high accuracy serving as an engine performance test machine for internal combustion engines.

It is another object of the invention to provide an economical torque control system for an engine performance test machine for internal combustion engines without an expensive torquemeter and/or computer as used in a learning control.

In order to accomplish the aforementioned and other objects, a torque control system for an engine performance test machine for internal combustion engines comprises an oscillating type electric dynamometer including a rotor and an oscillating member being oscillatably supported around the rotor, means for interconnecting the rotor shaft of the rotor and the rotating member of an internal combustion engine, means for monitoring oscillating torque of the oscillating member to generate a signal representative of the oscillating torque, means for generating a first torque signal representative of a first torque occurring at the rotor, means for generating a second torque signal representative of a second torque occurring at the rotating member of the engine, means for generating a detection signal representative of the sum of the oscillating torque signal, and the first and second torque signals, and a controller for controlling the torque generated by the engine according to a control value derived by comparing the detection signal with the preset torque command signal for the engine, the controller generating a control signal representative of the control value. The first torque generating means also comprises means for deriving the angular acceleration of the rotor to generate a signal representative of the angular acceleration of the rotor and means for multiplying the signal from the rotor angular acceleration deriving means by a moment of inertia of the rotor, while the second torque generating means also comprises means for deriving angular acceleration of the rotating member of the engine to generate a signal representative of the angular acceleration of the rotating member and means for multiplying the signal from the rotating member angular acceleration deriving means by a moment of inertia of the rotating member. The means for deriving the angular acceleration may comprise an accelerometer added to the rotating member of the engine or added to the rotor of the dynamometer.

According to another aspect of the invention, a torque control system for an engine performance test machine for internal combustion engines comprises an oscillating type electric dynamometer including a rotor and an oscillating member being oscillatably supported around the rotor, means for interconnecting the rotor shaft of the rotor and the rotating member of an internal combustion engine, first means for monitoring oscillating torque of the oscillating member, the first means generating a signal representative of the oscillating torque, second means for monitoring angular speed of the rotor, the second means generating a signal representative of the angular speed of the rotor, third means for monitoring angular speed of the rotating member of the engine, the third means generating a signal representative of the angular speed of the rotating member, a first differentiator for differentiating the angular speed of the rotor to generate a signal representative of the angular acceleration of the rotor, a second differentiator for differentiating the angular speed of the rotating member to generate a signal representative of the angular acceleration of the rotating member, means for generating a first torque signal representative of a first torque occurring at the rotor by multiplying the signal from the first differentiation means by a moment of inertia of the rotor, means for generating a second torque signal representative of a second torque occurring at the rotating member by multiplying the signal from the second differentiation means by a moment of inertia of the rotating member, means for generating a detection signal representative of the sum of the oscillating torque signal, and the first and second torque signals, and a controller for controlling the torque generated by the engine according to a control value derived by comparing the detection signal with the preset torque command signal for the engine, the controller generating a control signal representative of the control value. The first means comprises a load cell disposed between the oscillating member and the base of the dynamometer.

Preferably, the first means may comprise an accelerometer added to the oscillating member. The second and/or third means comprises a pickup used for monitoring angular speed. The first and/or second torque generating means comprises a multiplier. The detection signal generating means comprises an adder. The control signal from the controller is output to an accelerator actuator through which the accelerator of the engine is set to a predetermined angular position.

According to a further aspect of the invention, a torque control system for an engine performance test machine for internal combustion engines comprises an oscillating type electric dynamometer including a rotor and an oscillating member being oscillatably supported, around the rotor, means for interconnecting the rotor shaft of the rotor and the rotating member of an internal combustion engine, means for monitoring oscillating torque of the oscillating member to generate a signal representative of the oscillating torque, means for deriving angular acceleration of the rotor to generate a signal representative of the angular acceleration of the rotor, means for deriving angular acceleration of the rotating member of the engine to generate a signal representative of the angular acceleration of the rotating member, means for generating a first torque signal representative of a first torque occurring at the rotor by multiplying the signal from the rotor angular acceleration deriving means by a moment of inertia of the rotor, means for generating a second torque signal representative of a second torque occurring at the rotating member by multiplying the signal from the rotating member angular acceleration deriving means by a moment of inertia of the rotating member, means for generating a mean angular acceleration signal representative of a mean angular acceleration between the rotor of the dynamometer and the rotating member of the engine by dividing the sum of the first and second torque signals by the sum of the moments of inertia of the rotor and the rotating member, a multiplier for multiplying the mean angular acceleration signal by the moment of inertia of the rotor, the multiplier generating a torque signal representative of the torque component occurring at the moment of inertia of the rotor, means for generating a detection signal representative of a mean engine torque by adding the oscillating torque signal and the torque signal from the multiplier, and a controller for controlling the torque generated by the engine according to a control value derived by comparing the detection signal with the preset torque command signal for the engine, the controller generating a control signal representative of the control value.

BEST MODE FOR CARRYING OUT THE INVENTION

Figure 4:
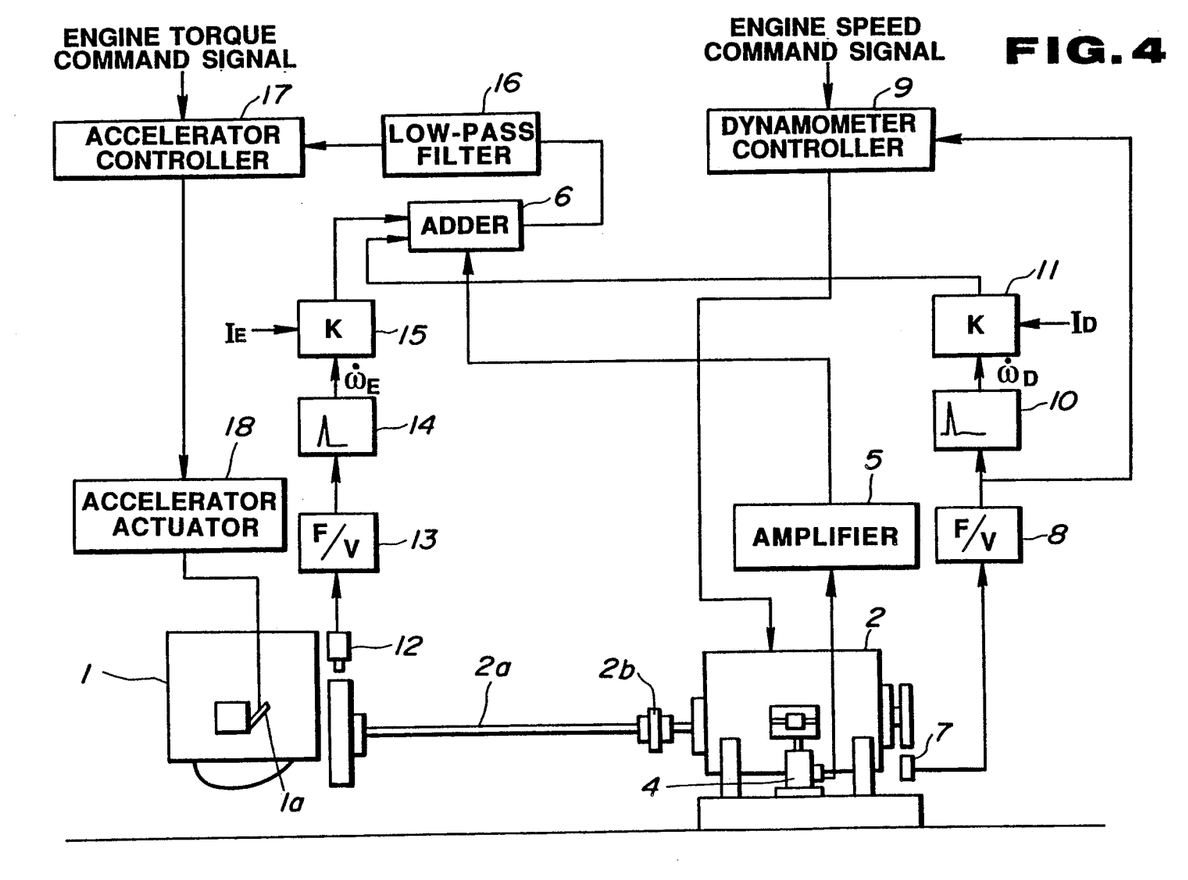
FIG. 4 is a block diagram illustrating the torque control system for the engine performance test machine for internal combustion engines of the first embodiment according to the present invention.
Figure 5:
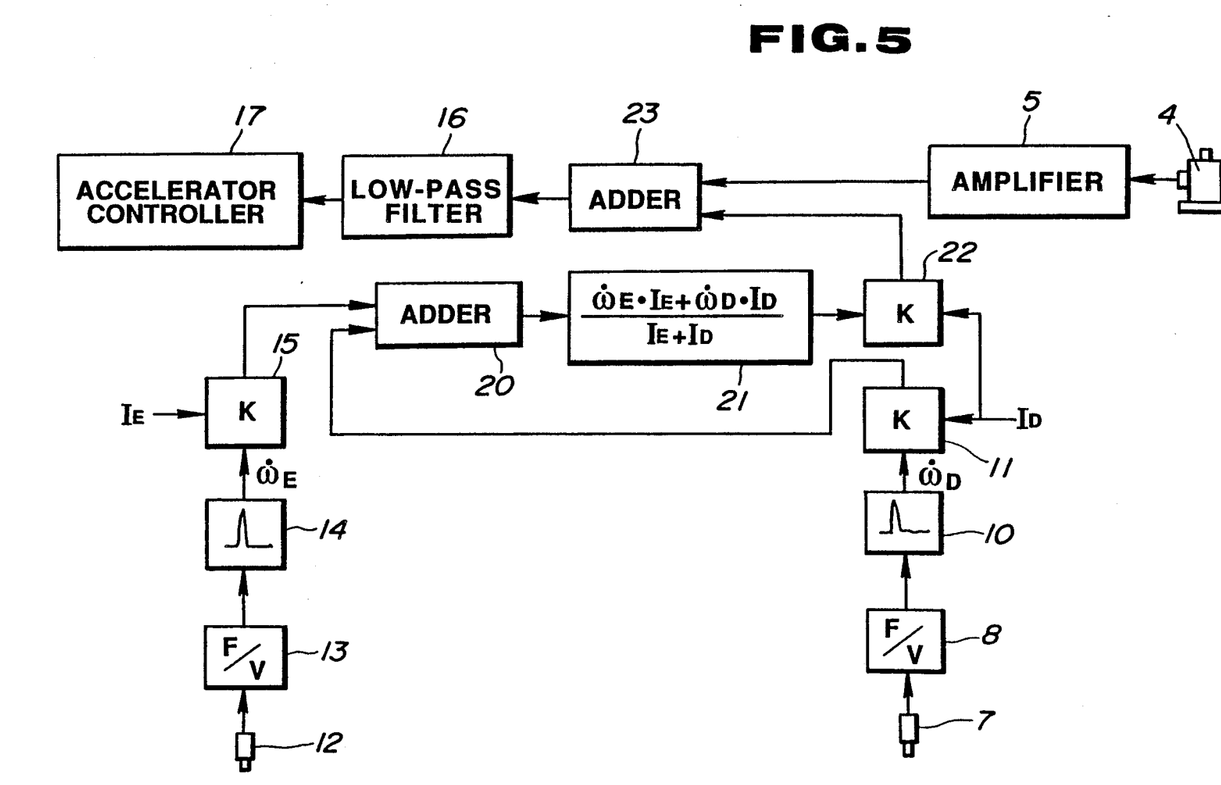
FIG. 5 is a block diagram illustrating the torque control system of the second embodiment according to the invention.

The principles of the present invention, applied to a torque control system for an engine performance test machine for internal combustion engines, are illustrated in FIGS. 4 and 5.

In the two preferred embodiments, the same reference numerals used to designate elements in the conventional torque control system for the engine performance test machine as shown in FIG. 1 will be applied to corresponding elements used in the embodiments according to the invention for the purpose of comparing the conventional system and the improved system.

Referring now in FIG. 4, the rotating member of the internal combustion engine 1 which includes a crankshaft and a flywheel is connected through a drive shaft 2a having a rubber damper and a coupling 2b to the rotor shaft of an oscillating type electric dynamometer 2. Reference numeral 4 denotes a load cell disposed between the base of the dynamometer and the previously described oscillating member so as to detect the oscillating torque of the oscillating member of the dynamometer 2. The oscillating torque is substantially equal to the component of the fluctuation in torque generated by the engine 1. The load cell 4 generates a signal representative of the oscillating torque. The signal from the load cell 4 is amplified through an amplifier 5 and thereafter is output to an adder 6 as an oscillating torque signal $T_L$.

A pickup 7 is provided in the vicinity of one end of the rotor shaft of the dynamometer 2 to detect the revolutions of the rotor of the dynamometer 2. The pickup 7 outputs a pulse signal representative of the revolution of the rotor shaft to a frequency/voltage transducer 8, and then the pulse signal from the pickup 7 is processed into an analog signal representative of the angular speed of the rotor of the dynamometer 2. Thereafter, the rotor angular speed signal $\omega_D$ is output from the frequency/voltage transducer 8 to a dynamometer controller 9, and is compared with a preset engine angular speed command signal representative of a preset engine angular speed. After comparing the preset angular speed command signal and the detected rotor angular speed signal, the dynamometer controller 9 outputs a signal representative of the difference between the two angular speed signals to the dynamometer 2. As a result, the load relative to the rotor of the dynamometer 2 is adjusted and thus the angular speed of the rotor is adjusted. In this manner, engine revolution is set to a predetermined value. The rotor angular speed signal $\omega_D$ is also output to a differentiator 10. Thereafter, the differentiator 10 processes the rotor angular speed signal $\omega_D$ into an angular acceleration signal $\dot{\omega}_D$ representative of an angular acceleration of the rotor. After this, the angular acceleration signal $\dot{\omega}_D$ is output from the differentiator 10 to a multiplier 11. The multiplier 11 multiplies the angular acceleration signal $\dot{\omega}_D$ by an axial moment of inertia $I_D$ of the rotor of the dynamometer 2 and generates a first torque signal $I_D \cdot \dot{\omega}_D$ representative of a torque component occurring at the moment of inertia $I_D$. The first torque signal $I_D \cdot \dot{\omega}_D$ is also output from the multiplier 11 to the adder 6.

In addition, a pickup 12 is provided in the vicinity of the output end of the rotating member of the engine 1 to detect the revolution of the rotating member of the engine 1. The pickup 12 outputs a pulse signal representative of the revolution of rotating member to a frequency/voltage transducer 13, and then the pulse signal from the pickup 12 is processed into an analog signal representative of the angular speed of the rotating member. Thereafter, the rotating member angular speed signal $\omega_E$ is output from the frequency/voltage transducer 8 to a differentiator 14 which processes the rotating member angular speed signal $\omega_E$ into an angular acceleration signal $\dot{\omega}_E$ representative of an angular acceleration of the rotating member. The angular acceleration signal is output from the differentiator 14 to a multiplier 15. The multiplier 15 multiplies the angular acceleration signal $\dot{\omega}_E$ by an axial moment of inertia $I_E$ of the rotating member including the crankshaft and the flywheel and generates a second torque signal $I_E \cdot \dot{\omega}_E$ representative of a torque component occurring at the moment of inertia $I_E$. Thereafter, the second torque signal $I_E \cdot \dot{\omega}_E$ is output from the multiplier 15 to an adder 6.

As set forth above, the adder 6 receives the oscillating torque signal $T_L$, and the first and second torque signals $I_D \cdot \dot{\omega}_D$ and $I_E \cdot \dot{\omega}_E$, and adds the three torque signals. The adder 6 outputs a total torque signal $(T_L + I_D \cdot \dot{\omega}_D + I_E \cdot \dot{\omega}_E)$ through a low-pass filter 16 to an accelerator controller 17. The sum $(T_L + I_D \cdot \dot{\omega}_D)$ of the two torque signals $T_L$ and $I_D \cdot \dot{\omega}_D$ is approximate to the engine torque signal detected by the torquemeter in accordance with the previously described conventional torque measuring method. However, the total torque signal $(T_L + I_D \cdot \dot{\omega}_D + I_E \cdot \dot{\omega}_E)$ corresponds to the actual torque generated by the engine 1. For this reason, the total torque signal also includes the torque component occurring at the moment of inertia $I_E$. The accelerator controller 17 compares the filtered total torque signal and an engine torque command signal and generates a control signal representative of the difference between the above mentioned two torque signals to an accelerator actuator 18. The accelerator actuator 18 adjusts the angular position of an accelerator 1a. Thus, the output torque of the engine 1 is set to a predetermined value.

According to the above described first embodiment of the invention, since the output torque of the engine is controlled by the actual detected torque as previously described, torque control may be precisely and quickly executed depending on the actual torque fluctuation of the engine, regardless of torque fluctuations due to the torsional vibration system comprising the engine, the connecting device, and the dynamometer.

FIG. 5 shows the second embodiment of the torque control system according to the invention. The torque control system according to the second embodiment is optimally applied to an engine performance test machine operated in accordance with a test method wherein it is required that the output torque is controlled not by the actual torque generated by the engine but the engine torque transmitted through the drive shaft to the dynamometer. That is, the torque control system according to the second embodiment is effective in torque control performed in accordance with the engine torque as measured at the drive shaft. The second embodiment will be hereinbelow described in brief, because the elements used in the second embodiment are similar to the elements used in the first embodiment.

Referring now to FIG. 5, the revolution of the rotor of the dynamometer 2 is detected by the pickup 7 and is processed through the frequency/voltage transducer 8, the differentiator 10, and the multiplier 11 in that order, and is fed to the adder 20 as a first torque signal $I_D \cdot \dot{\omega}_D$ representative of a torque component occurring at the moment of inertia $I_D$ of the rotor of the dynamometer 2. The revolution of the rotating member of the engine is detected by the pickup 12 and is processed through the frequency/voltage transducer 13, the differentiator 14, and the multiplier 15 in that order, and is fed to the adder 20 as a second torque signal $I_E \cdot \dot{\omega}_E$ representative of a torque component occurring at the moment of inertia $I_E$ of the rotating member of the engine. The adder 20 adds the first and second torque signals $I_D \cdot \dot{\omega}_D$ and $I_E \cdot \dot{\omega}_E$ and outputs a signal $(I_D \cdot \dot{\omega}_D + I_E \cdot \dot{\omega}_E)$ to a divider 21. The divider divides the signal from the adder 20 by the sum $(I_D + I_E)$ of the two moments of inertia $I_D$ and $I_E$ and outputs a signal $(I_D \cdot \dot{\omega}_D + I_E \cdot \dot{\omega}_E)/(I_D + I_E)$, to a multiplier 22. The signal output from the divider 21 corresponds to a mean angular acceleration signal representative of the mean angular acceleration of the rotor of the dynamometer and the rotating member of the engine. The mean angular acceleration signal is fed through the multiplier 22 to an adder 23 as a torque signal $I_D \cdot (I_D \cdot \dot{\omega}_D + I_E \cdot \dot{\omega}_E)/(I_D + I_E)$, not including the torque component occurring at the moment of inertia of the rotating member of the engine. The adder 23 also receives the oscillating torque signal $T_L$ which was previously described in the first embodiment, supplied from the load cell 4 through the amplifier 5. The adder 23 adds the two torque signals output from the amplifier 5 and the multiplier 22 and generates a mean engine torque signal $(T_L + I_D \cdot (I_D \cdot \dot{\omega}_D + I_E \cdot \dot{\omega}_E)/(I_D + I_E))$. The mean engine torque signal is filtered through the low-pass filter 16 and is fed to the accelerator controller 17 as a detected engine torque signal. Thus, the output torque of the engine is adjusted to a predetermined value by the accelerator controller 17. As set forth above, the torque control system according to the second embodiment may precisely control the output torque of the engine without a torquemeter.

Although in the two embodiments, torque control is effected by the accelerator controller, while the speed control is operated by the dynamometer controller, the torque control may be operated by the dynamometer controller and the speed control may be operated by the accelerator controller.

Furthermore, although in the embodiments, the moment of inertia of the rotor of the dynamometer and the moment of inertia of the rotating member of the engine are derived by the multipliers, a compensated moment of inertia which considers the moment of inertia of the connecting device may also be used for the previously described torque calculation.

Furthermore, in the embodiments, a load cell is provided to detect oscillating torque substantially equal to the component of torque fluctuation occurring in the engine. Since the load cell has elasticity, the vibration system is constructed by the load cell and the oscillating member of the dynamometer. For this reason, the performance of the torque control system is slightly lowered. Therefore, the oscillating torque may be monitored by an accelerometer added to the oscillating member to provide a torque control system with a higher accuracy.

Although the torque control system for an engine performance test machine is adapted for internal combustion engines, the system may be applied to diesel engines having a relatively large torque fluctuation.

Moreover, although in the embodiments, each angular acceleration is derived such that the angular speed of the rotating section to be measured is detected by the pickup and thereafter the detected angular speed is differentiated by a differentiator, the angular acceleration may be directly derived by an accelerometer.

While the foregoing is a description of the best mode for carrying out the invention, it will be understood that the invention is not limited to the particular embodiments shown and described herein, but may include variations and modifications without departing from the scope or spirit of this invention as described by the following claims.

What is claimed is:

1. A torque control system for an engine performance test machine for internal combustion engines comprising:
    an oscillating type electric dynamometer including a rotor and an oscillating member being oscillatably supported around said rotor;
    a rotating member of an internal combustion engine;
    means for interconnecting the rotor shaft of said rotor and the rotating member of an internal combustion engine;
    means for monitoring oscillating torque of said oscillating member to generate a signal representative of the oscillating torque;
    means for generating a first torque signal representative of a first torque occurring at said rotor;
    means for generating a second torque signal representative of a second torque occurring at the rotating member of said engine;
    means for generating a detection signal representative of the sum of said oscillating torque signal, and said first and second torque signals; and
    a controller for controlling the torque generated from said engine according to a control value derived by comparing said detection signal with a torque command signal for said engine.

2. The torque control system as set forth in claim 1, wherein said first torque generating means comprises means for deriving angular acceleration of said rotor to generate a signal representative of the angular acceleration of said rotor and means for multiplying the signal from said deriving means of the rotor angular acceleration by a moment of inertia of said rotor, and said second torque generating means comprises means for deriving angular acceleration of the rotating member of said engine to generate a signal representative of the angular acceleration of the rotating member and means for multiplying the signal from said deriving means of the rotating member angular acceleration by a moment of inertia of the rotating member.

3. A torque control system for an engine performance test machine for internal combustion engines comprising:
    an oscillating type electric dynamometer including a rotor and an oscillating member being oscillatably supported around said rotor;
    a rotating member of an internal combustion engine;
    means for interconnecting the rotor shaft of said rotor and the rotating member of an internal combustion engine;
    first means for monitoring oscillating torque of said oscillating member, said first means generating a signal representative of the oscillating torque;
    second means for monitoring angular speed of said rotor, said second means generating a signal representative of the angular speed of said rotor;
    third means for monitoring angular speed of the rotating member of said engine, said third means generating a signal representative of the angular speed of the rotating member;
    a first differentiator for differentiating the angular speed of said rotor to generate a signal representative of the angular acceleration of said rotor;
    a second differentiator for differentiating the angular speed of the rotating member to generate a signal representative of the angular acceleration of the rotating member;
    means for generating a first torque signal representative of a first torque occurring at said rotor by multiplying the signal from said first differentiator by a moment of inertia of said rotor;
    means for generating a second torque signal representative of a second torque occurring at the rotating member by multiplying the signal from said second differentiator by a moment of inertia of the rotating member;
    means for generating a detection signal representative of the sum of said oscillating torque signal, and said first and second torque signals; and
    a controller for controlling the torque generated from said engine according to a control value derived by comparing the detection signal with a torque command signal for said engine.

4. The torque control system as set forth in claim 3, wherein said first means comprises a load cell disposed between the oscillating member and the base of said dynamometer.

5. The torque control system as set forth in claim 3, wherein at least one of said second and third means comprises a pickup used for monitoring angular speed.

6. The torque control system as set forth in claim 3, wherein at least one of said first and second torque generating means comprises a multiplier.

7. The torque control system as set forth in claim 3, wherein said detection signal generating means comprises an adder.

8. The torque control system as set forth in claim 3, wherein the control signal from said controller is output to an accelerator actuator through which the accelerator of said engine is set to a predetermined angular position.

9. A torque control system for an engine performance test machine for internal combustion engines comprising:
an oscillating type electric dynamometer including a rotor and an oscillating member being oscillatably supported around said rotor;
a rotating member of an internal combustion engine;
means for interconnecting the rotor shaft of said rotor and the rotating member of an internal combustion engine;
means for monitoring oscillating torque of said oscillating member to generate a signal representative of the oscillating torque;
means for deriving angular acceleration of said rotor to generate a signal representative of the angular acceleration of said rotor;
means for deriving angular acceleration of the rotating member of said engine to generate a signal representative of the angular acceleration of the rotating member;
means for generating a first torque signal representative of a first torque occurring at said rotor by multiplying the signal from said deriving means of the angular acceleration of said rotor by a moment of inertia of said rotor;
means for generating a second torque signal representative of a second torque occurring at the rotating member by multiplying the signal from said deriving means of the angular acceleration of the rotating member by a moment of inertia of the rotating member;
means for generating a mean angular acceleration signal representative of the mean angular acceleration between said rotor of said dynamometer and the rotating member of said engine by dividing the sum of sad first and second torque signals by the sum of the moments of inertia of said rotor and the rotating member;
a multiplier for multiplying said mean angular acceleration signal by the moment of inertia of said rotor, said multiplier generating a torque signal representative of the torque component occurring at the moment of inertia of said rotor;
means for generating a detection signal representative of a mean engine torque by adding said oscillating torque signal and the torque signal from said multiplier; and
a controller for controlling the torque generated from said engine according to a control value derived by comparing the detection signal with a torque command signal for said engine.

10. The torque control system as set forth in claim 9, wherein said oscillating torque monitoring means comprises a load cell disposed between the oscillating member and the base of said dynamometer.

11. The torque control system as set forth in claim 9, wherein said angular acceleration deriving means comprises a pickup used for monitoring angular speed and a differentiator for differentiating the angular speed to derive angular acceleration.

12. The torque control system as set forth in claim 9, wherein at least one of said first and second torque generating means comprises a multiplier.

13. The torque control system as set forth in claim 9, wherein said detection signal generating means comprises an adder.

14. The torque control system as set forth in claim 9, wherein the control signal from said controller is output to an accelerator actuator through which the accelerator of said engine is set to a predetermined angular position.

15. A torque control system for an engine performance test machine for internal combustion engines comprising:
an oscillating type electric dynamometer including a rotor and an oscillating member being oscillatably supported around said rotor;
means for interconnecting the rotor shaft of said rotor and the rotating member of an internal combustion engine;
means for monitoring oscillating torque of said oscillating member to generate a signal representative of the oscillating torque;
means for generating a first torque signal representative of a first torque occurring at said rotor;
means for generating a second torque signal representative of a second torque occurring at said rotating member of said engine;
means for controlling the torque generated from said engine according to a control value derived on the basis of said oscillating torque signal, and said first and second torque signals.

* * * * *